US012785081B2

(12) United States Patent
Lin

(10) Patent No.: US 12,785,081 B2
(45) Date of Patent: Nov. 3, 2026

(54) NEGATIVE ELECTRODE PLATE AND ELECTROCHEMICAL APPARATUS AND ELECTRONIC APPARATUS INCLUDING THE NEGATIVE ELECTRODE PLATE

(71) Applicants: NINGDE AMPEREX TECHNOLOGY LIMITED, Ningde (CN); DONGGUAN AMPEREX TECHNOLOGY LIMITED, Dongguan (CN)

(72) Inventor: Lele Lin, Ningde (CN)

(73) Assignees: Ningde Amperex Technology Limited, Ningde City (CN); Dongguan Amperex Technology Limited, Dongguan (CN)

( * ) Notice: Subject to any disclaimer, the term of this patent is extended or adjusted under 35 U.S.C. 154(b) by 676 days.

(21) Appl. No.: 18/193,966

(22) Filed: Mar. 31, 2023

(65) Prior Publication Data

US 2023/0261180 A1 Aug. 17, 2023

Related U.S. Application Data

(63) Continuation of application No. PCT/CN2022/073758, filed on Jan. 25, 2022.

(30) Foreign Application Priority Data

Mar. 31, 2021 (CN) ......................... 202110349098.1

(51) Int. Cl.
*H01M 4/36* (2006.01)
*H01M 4/133* (2010.01)
(Continued)

(52) U.S. Cl.
CPC ........... *H01M 4/366* (2013.01); *H01M 4/133* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS

2020/0388833 A1* 12/2020 Lee ....................... H01M 4/625
2021/0328215 A1 10/2021 Zhang et al.
2022/0173389 A1* 6/2022 Tani ...................... H01M 4/133

FOREIGN PATENT DOCUMENTS

CN 104347842 A 2/2015
CN 106797020 A 5/2017
(Continued)

OTHER PUBLICATIONS

Office Action issued on Feb. 13, 2025, in corresponding Chinese Application No. 202110349098.1, 22 pages.
(Continued)

*Primary Examiner* — Zhongqing Wei
(74) *Attorney, Agent, or Firm* — Maier & Maier, PLLC

(57) ABSTRACT

A negative electrode plate, including a current collector, a first active substance layer, and a second active substance layer located between the current collector and the first active substance layer, where the first active substance layer includes first silicon-based material particles, and the second active substance layer includes second silicon-based material particles, a mass percentage of lithium in the first silicon-based material particles being A % and a mass percentage of lithium in the second silicon-based material particles being B %, where A>B. An electrochemical apparatus is provided, including the negative electrode plate.

17 Claims, 1 Drawing Sheet

(51) Int. Cl.

| | |
|---|---|
| ***H01M 4/134*** | (2010.01) |
| ***H01M 4/38*** | (2006.01) |
| ***H01M 4/587*** | (2010.01) |
| *H01M 4/02* | (2006.01) |

(52) U.S. Cl.

CPC ...... *H01M 4/587* (2013.01); *H01M 2004/021* (2013.01); *H01M 2004/027* (2013.01)

(56) References Cited

FOREIGN PATENT DOCUMENTS

| | | | | | |
|---|---|---|---|---|---|
| CN | 107710466 | A | | 2/2018 | |
| CN | 110416543 | A | | 11/2019 | |
| CN | 110419130 | A | | 11/2019 | |
| CN | 111261834 | A | | 6/2020 | |
| CN | 111542949 | A | | 8/2020 | |
| CN | 111868970 | A | | 10/2020 | |
| EP | 3886218 | A1 | * | 9/2021 | ........ H01M 10/0525 |
| JP | 2020149821 | A | | 9/2020 | |
| WO | 2020203420 | A1 | | 10/2020 | |

OTHER PUBLICATIONS

Office Action issued on Jul. 25, 2025, in corresponding Chinese Application No. 202110349098.1, 20 pages.

Extended Search Report issued on Jul. 7, 2025, in corresponding European Application No. 22778339.6, 8 pages.

International Search Report (English translation included) and Written Opinion issued on Apr. 11, 2022, in corresponding International Application No. PCT/CN2022/073758, 8 pages.

* cited by examiner

NEGATIVE ELECTRODE PLATE AND ELECTROCHEMICAL APPARATUS AND ELECTRONIC APPARATUS INCLUDING THE NEGATIVE ELECTRODE PLATE

CROSS-REFERENCE TO RELATED APPLICATIONS

This application is a continuation application of International Application No. PCT/CN2022/073758, filed on Jan. 25, 2022, which claims the benefit of priority of Chinese patent application No. 202110349098.1, filed on Mar. 31, 2021, the contents of which are incorporated herein by reference in its entirety.

TECHNICAL FIELD

This application relates to the field of energy storage technologies, and in particular to a negative electrode plate and an electrochemical apparatus and electronic apparatus including the negative electrode plate.

BACKGROUND

Having a theoretical specific capacity of up to 4200 mAh/g, silicon-based materials have application prospects as negative electrode active substances for next-generation electrochemical apparatuses. However, silicon-based materials shows a volume swelling rate of about 300% during charging and discharging processes, producing huge mechanical stress. During cycling, transverse swelling is prone to occur, causing an active substance layer to fall off a current collector, known as film shedding, or causing the current collector to crease and even tear, which in turn makes it impossible to transmit electrons during charging and discharging processes of the electrochemical apparatus, resulting in the total failure of the electrochemical apparatus. In addition, due to creasing of the current collector, an electrode assembly is deformed, affecting the cycling swelling and safety performance of the electrochemical apparatus and constraining the application of silicon materials.

Typically, it is necessary to reduce the amount of silicon in the active substance, increase the amount of binder in the electrode plate, and increase the thickness of the current collector to solve the creasing or tearing problem of the current collector, so as to relieve the problem of creasing of the current collector and deformation of the electrochemical apparatus. However, regardless of whether it is to reduce the amount of silicon material, increase the amount of binder, or increase the thickness of the current collector, the proportion of non-active materials in the electrochemical apparatus will be increased, leading to the reduction of the energy density and diminishing the energy density growth advantage brought by the silicon material, thereby constraining further application of silicon materials.

SUMMARY

In view of the disadvantage in the prior art, this application provides a negative electrode plate. In such negative electrode plate, mass distribution of lithium of a silicon-based material in an active substance layer is adjustable, contributing to easing the swelling of current collector caused by the silicon-based material, thereby relieving swelling stress of the electrode plate and avoiding interface problems caused by deformation of the current collector. Thus, film shedding of the electrode plate and deformation of the electrode assembly after cycling are suppressed and cycling swelling is relieved, achieving the effect of increasing energy density, improving cycling performance, and balancing the effect of swelling during cycling. This application further relates to an electrochemical apparatus including the negative electrode plate.

The first aspect of this application provides a negative electrode plate, including a current collector, a first active substance layer, and a second active substance layer located between the current collector and the first active substance layer, where the first active substance layer includes first silicon-based material particles, and the second active substance layer includes second silicon-based material particles, a mass percentage of lithium in the first silicon-based material particles being A % and a mass percentage of lithium in the second silicon-based material particles being B %, where A>B. In this application, mass distribution of lithium of the silicon-based material in the active substance layer is adjusted so that the percentage of lithium of the silicon-based material in the active substance layer closer to the current collector is lower than the percentage of lithium of the silicon-based material in the active substance layer farther away from the current collector, reducing swelling on the current collector of the active substance layer closer to the current collector, and avoiding interface problems caused by deformation of the current collector. Thus, film shedding of the electrode plate and deformation of the electrode assembly after cycling are suppressed and cycling swelling is relieved, achieving the effect of increasing energy density, improving cycling performance, and balancing the effect of cycling swelling.

According to some embodiments of this application, $8 \le A \le 15$, and $0 \le B \le 3$. According to some embodiments of this application, $A/B \ge 5$. In this application, A/B is controlled to have a proper value, thus balancing the energy density, cycle life, and cycling swelling performance. A/B being undesirably small causes a lower proportion of active lithium in the entire electrode plate participating in cycling after formation, impacting the energy density of the electrochemical apparatus, thus failing to exhibit the advantage of silicon system materials in energy density.

According to some embodiments of this application, the first silicon-based material particles include one or more of $Li_2SiO_3$, $Li_4SiO_4$, or $Li_2Si_2O_5$.

According to some embodiments of this application, surface of the first silicon-based material particles has one or more of $M_xSiO_y$ or carbon, where M includes at least one of Mg, Al, Zn, Ca, Ba, or B, $0<x<3$ and $0.5<y<6$.

According to some embodiments of this application, the second silicon-based material particles include $SiO_x$, where $0.6 \le x \le 1.5$.

According to some embodiments of this application, the second silicon-based material particles satisfy $0 \le I_2/I_1 \le 1$, where $I_1$ indicates a largest intensity of peaks at 2θ of 28.0° to 29.5° as in an X-ray diffraction pattern of the second silicon-based material particles, and $I_2$ indicates a largest intensity of peaks at 2θ of 20.0° to 21.5° as in an X-ray diffraction pattern of the second silicon-based material particles. When $I_2/I_1$ is greater than 1, nano-silicon crystallites inside the silicon negative electrode material have a large size, causing undesirably large swelling of the negative electrode, which is not conducive to the cycling performance.

According to some embodiments of this application, a median particle size $D_v50$ of the first silicon-based material particles is greater than a median particle size $D_v50$ of the second silicon-based material particles, where the median particle size $D_v50$ of the first silicon-based material particles satisfies 5 μm≤$D_v50$≤25 μm, and the median particle size $D_v50$ of the second silicon-based material particles satisfies 1 μm≤$D_v50$≤8 μm. Having a small size and low cycling swelling, the underlayer silicon layer causes a small swelling force to the current collector, and therefore tearing rate of the electrode plate after cycling obviously decreases.

According to some embodiments of this application, porosity of the first active substance layer is $K_1$%, and porosity of the second active substance layer is $K_2$%, where $K_1>K_2$, $25<K_1<60$, and $23<K_2<55$. When the porosity of the first active substance layer is less than the porosity of the second active substance layer, lithium ions diffuse difficultly, causing precipitation of lithium after cycling and an obvious capacity reduction. In contrast, when the porosity of the first active substance layer is greater than the porosity of the second active substance layer, the cycling performance and kinetic performance of the lithium-ion battery can be improved. The large porosity is favorable for the infiltration of electrolyte and diffusion of lithium ions, further reducing the risk of lithium precipitation on the negative electrode after cycling, thereby avoiding cycling degradation caused by the precipitation of lithium.

According to some embodiments of this application, the first active substance layer and the second active substance layer each independently include at least one of artificial graphite, natural graphite, mesocarbon microbeads, lithium titanate, soft carbon, or hard carbon.

A second aspect of this application provides an electrochemical apparatus, the electrochemical apparatus including the negative electrode plate according to the first aspect.

According to some embodiments of this application, the negative electrode plate satisfies at least one of following conditions (a) to (e): (a) 8≤A≤15 and 0≤B≤3; (b) A/B≥5; (c) the first silicon-based material particles include one or more of $Li_2SiO_3$, $Li_4SiO_4$, or $Li_2Si_2O_5$, (d) a median particle size $D_v50$ of the first silicon-based material particles is greater than a median particle size $D_v50$ of the second silicon-based material particles, where the median particle size $D_v50$ of the first silicon-based material particles satisfies 5 μm≤$D_v50$≤25 μm, and the median particle size $D_v50$ of the second silicon-based material particles satisfies 1 μm≤$D_v50$≤8 μm; and (e) porosity of the first active substance layer is $K_1$%, and porosity of the second active substance layer is $K_2$%, where $K_1>K_2$, $25<K_{1<60}$, and $23<K_2<55$.

A third aspect of this application provides an electronic apparatus, the electronic apparatus including the electrochemical apparatus according to the second aspect.

In this application, mass distribution of lithium of the silicon-based material in the active substance layer is adjusted so that the percentage of lithium of the silicon-based material in the active substance layer closer to the current collector is lower than the percentage of lithium of the silicon-based material in the active substance layer farther away from the current collector, reducing swelling on the current collector of the active substance layer closer to the current collector, and avoiding interface problems caused by deformation of the current collector. Thus, film shedding of the electrode plate and deformation of the electrode assembly after cycling are suppressed and cycling swelling is relieved, achieving the effect of increasing energy density, improving cycling performance, and balancing the effect of swelling during cycling.

DETAILED DESCRIPTION

Figure 1:
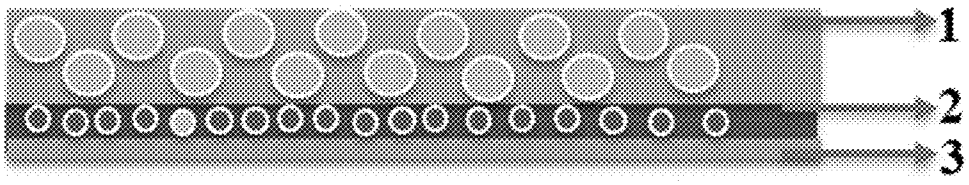
FIG. 1 is a schematic structural diagram of a negative electrode plate according to an embodiment of this application, where 1 represents a first active substance layer, 2 represents a second active substance layer, and 3 represents a current collector.

To make the objectives, technical solutions, and advantages of this application clearer, the following clearly describes the technical solutions in this application with reference to some embodiments. Apparently, the described embodiments are some but not all of the embodiments of this application. The embodiments described herein are illustrative in nature and used to provide a basic understanding of this application. The embodiments of this application should not be construed as any limitations on this application. All other embodiments obtained by a person skilled in the art based on the technical solutions provided in this application and the embodiments provided in this application fall within the protection scope of this application.

Unless otherwise specified, the terms used in this application have well known meanings as commonly understood by persons skilled in the art. Unless otherwise specified, numerical values of parameters mentioned in this application may be measured by using various measurement methods commonly used in the art (for example, they may be tested by using the methods provided in the examples of this application).

The term "about" is intended to describe and depict small variations. When used in combination with an event or a circumstance, the term may refer to an example of exact occurrence of the event or circumstance or an example of extremely approximate occurrence of the event or circumstance. For example, when used in combination with a numerical value, the term may refer to a variation range within ±10% of the value, for example, within ±5%, within ±4%, within ±3%, within ±2%, within ±1%, within ±0.5%, within ±0.1%, or within ±0.05%. In addition, quantities, ratios, and other values are sometimes presented in the format of ranges in this specification. It should be understood that such range formats are used for convenience, simplicity and should be flexibly understood as including not only values clearly designated as falling within the range but also all individual values or sub-ranges covered by the range as if each value and sub-range are clearly designated.

A list of items connected by the terms "at least one of", "at least one piece of", "at least one kind of", or the like may mean any combination of the listed items. For example, if items A and B are listed, the phrase "at least one of A or B" means only A; only B; or A and B. In another example, if items A, B, and C are listed, the phrase "at least one of A, B, or C" means only A; only B; only C; A and B (exclusive of C); A and C (exclusive of B); B and C (exclusive of A); or all of A, B, and C. The item A may contain a single constituent or a plurality of constituents. The item B may contain a single constituent or a plurality of constituents. The item C may contain a single constituent or a plurality of constituents.

In contrast with silicon materials, $SiO_x$ materials have a theoretical specific capacity of about 2000 mAh/g, and because of a mixed-phase structure of silicon and oxide, $SiO_x$ materials can effectively relieve the volume effect of silicon during charge and discharge, improving cycling stability of the material, thus easier to realize commercial application. Specifically, during use of $SiO_x$ in initial lithium intercalation, irreversible phases of lithium silicate and $Li_2O$ can be used as a buffer matrix for resisting volume change during lithiation/de-lithiation. Therefore, adjusting the oxygen concentration of the $SiO_x$ material changes the proportion of its buffer phase, thereby improving the swelling characteristics and enhancing the cycling performance of the battery. However, with the oxygen concentration increasing, the irreversible phases of the lithium silicate and $Li_2O$ increase, causing the first-cycle coulombic efficiency to decrease, thereby weakening the advantage in energy density. To resolve the problem of low first-cycle efficiency of the $SiO_x$ material, a variety of lithiation strategies have been developed to compensate for the Li consumed on the negative electrode during the first charge, thus obtaining a silicon material having high first-cycle efficiency and in turn resolving the energy density problem. However, because pre-lithiation is an exothermic reaction which often requires high-temperature sintering, primitive silicon crystallites of the pre-lithiated silicon material grow under the high temperature. As a result, the pre-lithiated silicon material has degraded cycling performance and degraded swelling characteristics although its first-cycle efficiency is increased. To resolve the technical problem, this application provides a negative electrode plate and an electrochemical apparatus and electronic apparatus including the negative electrode plate.

I. Negative Electrode Plate

The negative electrode plate according to this application includes a current collector, a first active substance layer, and a second active substance layer located between the current collector and the first active substance layer, where the first active substance layer includes first silicon-based material particles, and the second active substance layer includes second silicon-based material particles, a mass percentage of lithium in the first silicon-based material particles being A % and a mass percentage of lithium in the second silicon-based material particles being B %, where A>B. In this application, mass distribution of lithium of the silicon-based material in the active substance layer is adjusted so that the percentage of lithium of the silicon-based material in the active substance layer closer to the current collector is lower than the percentage of lithium of the silicon-based material in the active substance layer farther away from the current collector, reducing swelling on the current collector of the active substance layer closer to the current collector, and avoiding interface problems caused by deformation of the current collector. Thus, film shedding of the electrode plate and deformation of the electrode assembly after cycling are suppressed and cycling swelling is relieved, achieving the effect of increasing energy density, improving cycling performance, and balancing the effect of cycling swelling.

Figure 2:
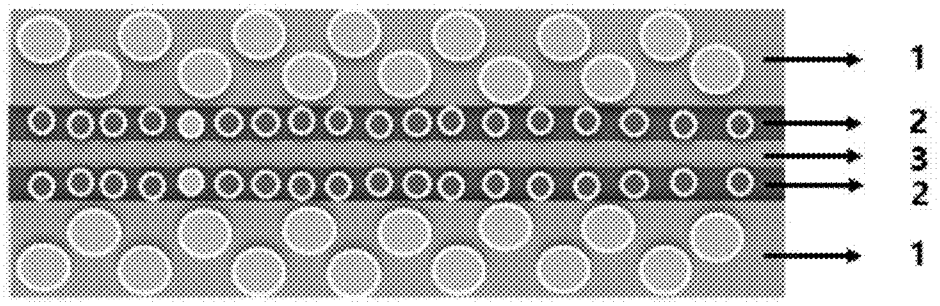
FIG. 2 is a schematic structural diagram of a negative electrode plate according to another embodiment of this application, where 1 represents a first active substance layer, 2 represents a second active substance layer, and 3 represents a current collector.
Figure 3:
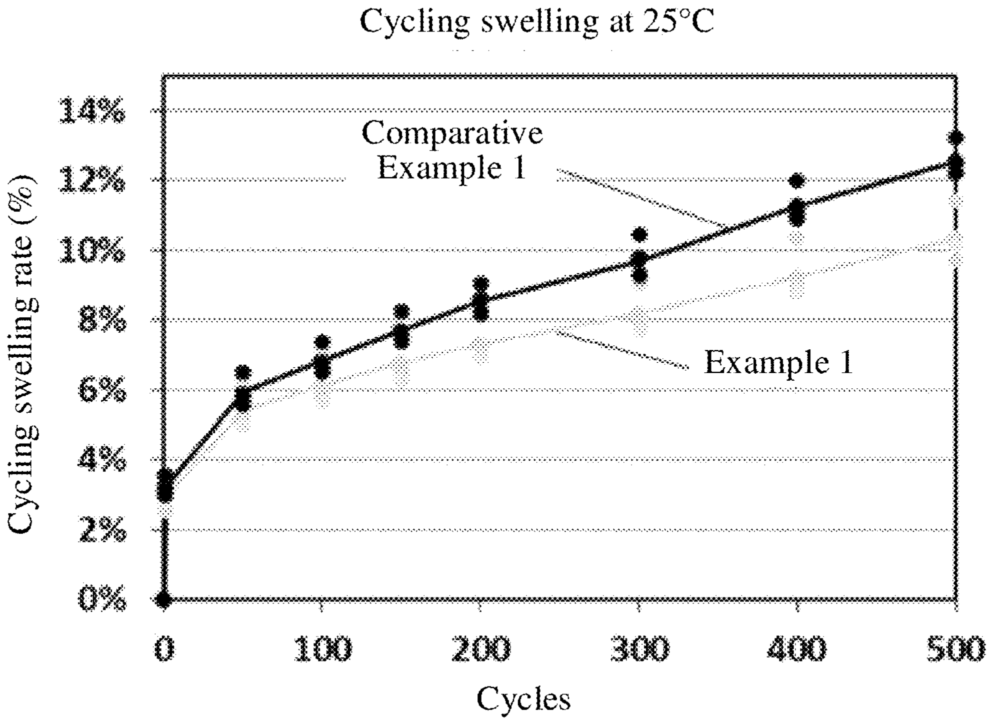
FIG. 3 is a diagram comparing the cycling swelling of Example 1 and Comparative Example 1.

As shown in FIG. 1, some embodiments of this application provide a negative electrode plate. The negative electrode plate includes a current collector 3 and an active substance layer, where the active substance layer includes a first active substance layer 1 and a second active substance layer 2. Although in FIG. 1, the active substance layers are illustrated on one side of the current collector as merely an example. The active substance layers can be located on two sides of the current collector as shown in FIG. 2. In some embodiments, the current collector of the negative electrode plate may include at least one of copper foil, aluminum foil, nickel foil, or a carbon-based current collector.

According to some embodiments of this application, $8 \le A \le 15$. In some embodiments of this application, A may be 8.5, 9.0, 9.5, 10, 10.5, 11.0, 11.5, 12.0, 12.5, 13.0, 13.5, 14.0, 14.5, or in a range defined by any two of these values. An undesirably high mass percentage of lithium in the first silicon-based material particles requires a high temperature for pre-lithiation, causing the size of primitive silicon crystallites to grow, which is not conducive to cycling and swelling reduction.

According to some embodiments of this application, $0 \le B \le 3$. In some embodiments, B may be 0, 0.1, 0.3, 0.7, 0.9, 1.0, 1.1, 1.3, 1.5, 1.7, 1.9, 2.0, 2.3, 2.5, 2.7, 2.9, or in a range defined by any two of these values. When the mass percentage of lithium in the second silicon-based material particles is undesirably high, heat release is present during the pre-lithiation because of the high degree of pre-lithiation, causing the primitive silicon crystallites to grow and the volume swelling to increase during cycling, thereby accelerating the swelling on the current collector and deformation of the current collector.

According to some embodiments of this application, $A/B \ge 5$. In some embodiments, A/B may be 5, 7, 10, 15, 20, 30, or in a range defined by any two of these values. In this application, A/B is controlled to have a proper value, thus balancing the energy density, cycle life, and cycling swelling performance. AB being undesirably small causes a lower proportion of active lithium in the entire electrode plate participating in cycling after formation, impacting the energy density of the electrochemical apparatus, thus failing to exhibit the advantage of silicon system materials in energy density.

According to some embodiments of this application, the first silicon-based material particles include one or more of $Li_2SiO_3$, $Li_4SiO_4$, or $Li_2Si_2O_5$. According to some embodiments of this application, the surface of the first silicon-based material particles has one or more of $M_xSiO_y$ or carbon, where M includes at least one of Mg, Al, Zn, Ca, Ba, or B, $0<x<3$ and $0.5<y<6$. The first silicon-based material particles according to this application have characteristic peaks of $Li_2SiO_3$, $Li_4SiO_4$, $Li_2Si_2O_5$, or the like in an X-ray diffraction pattern, and therefore have a high first-cycle efficiency, obviously increasing the energy density. In some embodiments of this application, the first silicon-based material particles include pre-lithiated silicon oxides, where conventional methods in this field can be used as the method of pre-lithiation.

According to some embodiments of this application, the second silicon-based material particles include $SiO_x$, where $0.6 \le x \le 1.5$. In some embodiments, the second silicon-based material particles include nano-Si crystallites, SiO, $SiO_2$, or any combination thereof.

According to some embodiments of this application, the second silicon-based material particles satisfy $0 \le I_2/I_1 \le 1$, where $I_1$ indicates a largest intensity of peaks at 2θ of 28.0° to 29.5° as in an X-ray diffraction pattern of the second silicon-based material particles, and 12 indicates a largest intensity of peaks at 2θ of 20.0° to 21.5° as in an X-ray diffraction pattern of the second silicon-based material particles. In some embodiments, $I_2/I_1$ may be 0.1, 0.2, 0.3, 0.4, 0.5, 0.6, 0.7, 0.8, 0.9, or in a range defined by any two of these values. When $I_2/I_1$ is greater than 1, nano-silicon crystallites inside the silicon negative electrode material have a large size, causing undesirably large swelling of the negative electrode, which is not conducive to the cycling performance.

According to some embodiments of this application, a median particle size $D_v50$ of the first silicon-based material particles is greater than a median particle size $D_v50$ of the second silicon-based material particles. With $D_v50$ of the silicon-based material particles in the first active substance layer greater than $D_v50$ of the silicon-based material particles in the second active substance layer, the underlayer silicon has a small size and low cycling swelling and causes a small swelling force to the current collector, and therefore tearing rate of the electrode plate after cycling obviously decreases. In some embodiments, the median particle size $D_v50$ of the first silicon-based material particles satisfies 5 μm≤$D_v50$≤25 μm, for example, being 7 μm, 9 μm, 10 μm, 11 μm, 12 μm, 13 μm, 15 μm, 17 μm, 19 μm, 20 μm, 23 μm, or in the range defined by any two of these values. In some embodiments, the median particle size $D_v50$ of the second silicon-based material particles satisfies 1 μm≤$D_v50$≤8 μm, for example, being 2 μm, 3 μm, 4 μm, 5 μm, 6 μm, 7 μm, or in a range defined by any two of these values. In this application, $D_v50$ is a particle diameter where the accumulative volume distribution reaches 50% as obtained by using a laser nanometer size analyzer.

According to some embodiments of this application, porosity of the first active substance layer is $K_1$%, and porosity of the second active substance layer is $K_2$%, where $K_1>K_2$. When the porosity of the first active substance layer is less than the porosity of the second active substance layer, lithium ions diffuse difficultly, causing precipitation of lithium after cycling, thus obviously reducing the capacity. In contrast, when the porosity of the first active substance layer is greater than the porosity of the second active substance layer, the cycling performance and kinetic performance of the lithium-ion battery can be improved. The large porosity is favorable for the infiltration of electrolyte and diffusion of lithium ions, further reducing the risk of lithium precipitation on the negative electrode after cycling, thereby avoiding cycling degradation caused by the precipitation of lithium. In some embodiments, $25<K_1<60$, for example, being 30, 32, 34, 36, 38, 40, 43, 45, 50, 55, or in a range defined by any two of these values. In some embodiments, $23<K_2<55$, for example, being 25, 26, 27, 28, 29, 30, 33, 35, 40, 45, 50, or in a range defined by any two of these values.

According to some embodiments of this application, the first active substance layer and the second active substance layer each include at least one of artificial graphite, natural graphite, mesocarbon microbeads, lithium titanate, soft carbon, or hard carbon.

According to some embodiments of this application, the first active substance layer has a thickness of 0.2 μm to 200 μm, and the second active substance layer has a thickness of 0.2 μm to 200 μm. If the thickness of the first active substance layer or the second active substance layer is undesirably small, sufficient active substance cannot be retained, which impacts the energy density. In contrast, if the thickness of the first active substance or the second active substance layer is undesirably large, the electrolyte may have poor liquid phase diffusion in the active substance layer closer to the current collector (which is the first active substance layer).

According to some embodiments of this application, a mass percentage of silicon in the first active substance layer is 0.1% to 40%. According to some embodiments of this application, a mass percentage of silicon in the second active substance layer is 0.1% to 20%.

According to some embodiments of this application, the mass percentage of silicon in the first active substance layer is greater than the mass percentage of silicon in the second active substance layer. With the mass percentage of silicon in the first active substance layer greater than the mass percentage of silicon in the second active substance layer, a stress produced by stretch of the silicon-based material particles as experienced by the current collector can be effectively decreased, relieving the problems of shedding of the active substance layer, deformation of the electrode assembly, and tearing of the current collector.

According to some embodiments of this application, the first active substance layer and the second active substance layer each include a conductive agent and/or a binder. In some embodiments, the conductive agent includes at least one of conductive carbon black, acetylene black, carbon nanotubes, ketjen black, conductive graphite, or graphene. In some embodiments, a mass percentage of the conductive agent in the active substance layer is 0.5% to 10%. In some embodiments, the binder includes at least one of polyvinylidene fluoride, vinylidene fluoride-hexafluoropropylene copolymer, polyamide, polyacrylonitrile, polyropylene, polyacrylic acid, polyacrylate, sodium carboxymethylcellulose, polyvinylpyrrolidone, polyvinyl ether, polymethyl methacrylate, polytetrafluoroethylene, polyhexafluoropropylene, or styrene-butadiene rubber. In some embodiments, a mass percentage of the binder in the active substance layer is 0.5% to 10%. The negative electrode plate according to this application may be prepared by using a commonly known method in the art. Typically, a negative electrode active material, an optional conductive agent (for example, a carbon material such as carbon black and metal particles) and binder (for example, SBR), other optional additives (for example, PTC thermistor material), and other materials are mixed and dispersed in a solvent (for example, deionized water), the resulting mixture is stirred to form a uniform slurry, and then the slurry is evenly applied on a negative electrode current collector, followed by drying, to obtain a negative electrode including a negative electrode active substance layer. A material such as metal foil or a porous metal plate may be used as the negative electrode current collector.

According to some embodiments of this application, thickness of the negative electrode plate of this application is 3 μm to 500 μm.

II. Electrochemical Apparatus

The electrochemical apparatus according to this application includes any apparatus in which electrochemical reactions take place. Specific examples of the apparatus include all kinds of primary batteries and secondary batteries. Specially, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus of this application includes a positive electrode, a negative electrode, a separator, and an electrolyte.

1. Negative Electrode

The negative electrode in the electrochemical apparatus of this application includes the negative electrode plate in the first aspect.

According to some embodiments of this application, the negative electrode plate includes a current collector, a first active substance layer, and a second active substance layer located between the current collector and the first active substance layer, where first active substance layer includes first silicon-based material particles, and the second active substance layer includes second silicon-based material particles, a mass percentage of lithium in the first silicon-based material particles being A % and a mass percentage of lithium in the second silicon-based material particles being B %, where A>B. In some embodiments, 8≤A≤15. In some embodiments, 0≤B≤3. In some embodiments, A/B≥5.

According to some embodiments of this application, the first silicon-based material particles include one or more of $Li_2SiO_3$, $Li_4SiO_4$, or $Li_2Si_2O_5$.

According to some embodiments of this application, a median particle size $D_v50$ of the first silicon-based material particles is greater than a median particle size $D_v50$ of the second silicon-based material particles, where the median particle size $D_v50$ of the first silicon-based material particles satisfies 5 μm≤$D_v50$≤25 μm, and the median particle size $D_v50$ of the second silicon-based material particles satisfies 1 μm≤$D_v50$≤8 μm.

According to some embodiments of this application, porosity of the first active substance layer is $K_1$%, and porosity of the second active substance layer is $K_2$%, where $K_1>K_2$, $25<K_1<60$, and $23<K_{2<55.}$ 2. Positive Electrode Materials, compositions and manufacturing methods which can be used for the positive electrode in the embodiments of this application include any technologies disclosed in the prior art.

According to some embodiments of this application, the positive electrode includes a current collector and a positive electrode active material layer located on the current collector. According to some embodiments of this application, the positive electrode active material includes but is not limited to lithium cobalt oxide ($LiCoO_2$), lithium nickel cobalt manganate (NCM), lithium nickel cobalt aluminate, lithium iron phosphate ($LiFePO_4$), or lithium manganate ($LiMn_2O_4$).

According to some embodiments of this application, the positive electrode active material layer further includes a binder, and optionally a conductive material. The binder enhances binding between particles of the positive electrode active material and binding between the positive electrode active material and the current collector. In some embodiments, the binder includes polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene 1,1-difluoride, polyethylene, polypropylene, styrene-butadiene rubber, acrylic styrene-butadiene rubber, epoxy resin, nylon, or the like.

According to some embodiments of this application, the conductive material includes but is not limited to carbon-based materials, metal-based materials, conductive polymers, and mixtures thereof. In some embodiments, the carbon-based material is selected from carbon black, acetylene black, ketjen black, carbon fiber, carbon nanotube, or any combination thereof. In some embodiments, the metal-based material is selected from metal powder, metal fiber, copper, nickel, aluminum, or silver. In some embodiments, the conductive polymer is a polyphenylene derivative.

According to some embodiments of this application, the current collector may include but is not limited to aluminum.

3. Electrolyte

Electrolytes that can be used in the embodiments of this application may be electrolytes known in the prior art.

In some embodiments, the electrolyte includes an organic solvent, a lithium salt, and an additive. The organic solvent of the electrolyte according to this application may be any organic solvent known in the prior art which can be used as a solvent for electrolytes. The electrolytic salt used in the electrolyte according to this application is not limited, and may be any electrolytic salt known in the prior art. The additive of the electrolyte according to this application may be any additive known in the prior art which can be used as an additive for electrolytes.

In some embodiments, the organic solvent includes but is not limited to ethylene carbonate (EC), propylene carbonate (PC), diethyl carbonate (DEC), ethyl methyl carbonate (EMC), dimethyl carbonate (DMC), 1, 2-propanediol cyclic carbonate, or ethyl propionate.

In some embodiments, the lithium salt includes but is not limited to lithium hexafluorophosphate ($LiPF_6$), lithium tetrafluoroborate ($LiBF_4$), lithium difluorophosphate ($LiPO_2F_2$), lithium bistrifluoromethanesulfonimide $LiN(CF_3SO_2)_2$(LiTFSI), lithium bis(fluorosulfonyl)imide $Li(N(SO_2F)_2)$(LiFSI), lithium bis(oxalate) borate $LiB(C_2O_4)_2$ (LiBOB), or lithium difluoro(oxalato)borate $LiBF_2(C_2O_4)$ (LiDFOB).

In some embodiments, concentration of the lithium salt in the electrolyte is about 0.5 mol/L to 3 mol/L, about 0.5 mol/L to 2 mol/L, or about 0.8 mol/L to 1.5 mol/L.

4. Separator

The separator used in the electrochemical apparatus according to this application is not particularly limited in material or shape, and may be made by using any technologies disclosed in the prior art. In some embodiments, the separator includes a polymer or an inorganic substance formed by a material stable to the electrolyte of this application.

For example, the separator may include a substrate layer and a surface treatment layer. The substrate layer is a non-woven fabric, membrane, or composite membrane having a porous structure, and material of the base material layer is selected from at least one of polyethylene, polypropylene, polyethylene terephthalate, or polyimide. Specifically, a polypropylene porous membrane, a polyethylene porous membrane, a polypropylene non-woven fabric, a polyethylene non-woven fabric, or a polypropylene-polyethylene-polypropylene porous composite membrane may be selected.

The surface treatment layer is provided on at least one surface of the substrate layer, and the surface treatment layer may be a polymer layer or an inorganic layer, or may be a layer formed by mixing polymer and inorganic substance.

The inorganic substance layer includes inorganic particles and a binder. The inorganic particles are selected from at least one of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, or barium sulfate. The binder is selected from at least one of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, or polyhexafluoropropylene.

The polymer layer includes a polymer, and material of the polymer is selected from at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

III. Electronic Apparatus

This application further provides an electronic apparatus including the electrochemical apparatus in the second aspect of this application.

The electronic device or apparatus in this application is not particularly limited. In some embodiments, the electronic device of this application includes but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a drone, a motor, an automobile, a motorcycle, a motor bicycle, a bicycle, a lighting appliance, a toy, a game console, a clock, an electric tool, a flash lamp, a camera, a large household battery, and a lithium-ion capacitor.

The following describes the technical solutions of this application illustratively using specific examples.

Example 1

1. Preparation of Negative Electrode Plate

A 10 μm thick copper foil was used as the current collector; a pre-lithiated silicon oxide and graphite were used as the first active substance, where the pre-lithiated silicon oxide included one or more of $Li_2SiO_3$, $Li_4SiO_4$, or $Li_2Si_2O_5$; the second active substance used was $SiO_{1.2}$ and artificial graphite and optionally pre-lithiated $SiO_{1.2}$; acetylene black was used as the conductive agent; and the binder used was butadiene styrene rubber and sodium carboxymethylcellulose. The second active substance (15% $SiO_{1.2}$ and optional prelithiated $SiO_{1.2}$+85% graphite), acetylene black, butadiene styrene rubber and sodium carboxymethylcellulose were mixed at a weight ratio of 96:1:1.5:1.5, then the mixture was dispersed in deionized water to produce a slurry, and the slurry was stirred to uniformity and applied onto the copper foil, followed by drying, to form the second active substance layer, where the second active substance layer had a thickness of 25 and the mass percentage of silicon in the second active substance layer was 5%. The first active substance (15% prelithiated silicon oxide+85% graphite), acetylene black, butadiene styrene rubber and sodium carboxymethylcellulose were mixed at a weight ratio of 96:1:1.5:1.5, then the mixture was dispersed in deionized water to produce a slurry, and the slurry was stirred to uniformity and applied onto the second active substance layer, followed by drying, to form the first active substance layer, where the first active substance layer had a thickness of 80 and the mass percentage of silicon in the first active substance layer was 15%. After cold pressing and slitting, a negative electrode plate was obtained.

2. Preparation of Positive Electrode Plate

A positive active substance $LiCoO_2$, acetylene black, and a binder polyvinylidene fluoride (PVDF) were fully stirred and mixed well in an N-methyl pyrrolidone solvent system at a mass ratio of 94:3:3, and then the resulting mixture was applied onto an aluminum foil, followed by drying and cold pressing to obtain a positive electrode plate.

3. Preparation of Separator

Polyvinylidene fluoride was dissolved in water, and a mechanical stir was applied to produce a uniform slurry, and then the slurry was applied onto two side surfaces of a porous substrate (polyethylene) coated with ceramic coating on two sides, followed by drying to obtain a separator.

4. Preparation of Electrolyte

Under an environment with a moisture content of less than 10 ppm, lithium hexafluorophosphate and a non-aqueous organic solvent (ethylene carbonate (EC):diethyl carbonate (DEC):propylene carbonate (PC):propyl propionate (PP):vinylene carbonate (VC)=20:30:20:28:2, by weight) were mixed at a weight ratio of 8:92 to prepare an electrolyte with a concentration of lithium salt being 1 mol/L.

5. Preparation of Lithium-Ion Battery

The positive electrode plate, separator, and negative electrode plate were stacked in sequence such that the separator was sandwiched between the positive electrode plate and the negative electrode plate for separation, and the stack was wound to obtain an electrode assembly. The electrode assembly was placed in an aluminum-plastic film outer package, and was dehydrated at a temperature of 80° C., then the above-mentioned electrolyte was injected and the package was sealed, followed by processes including formation, degassing, and shaping, to obtain a lithium-ion battery.

In Examples 2 to 15 and Comparative Example 1, the positive electrode plate, separator, electrolyte, and lithium-ion battery were prepared in the same way as the positive electrode plate, separator, electrolyte, and lithium-ion battery in Example 1 except for the preparation of the negative electrode plate. The differences in parameters are shown in the corresponding tables below.

Methods for Determining Performance Parameters in the Examples and Comparative Examples Electrode plate porosity test: a fully charged lithium-ion battery was fully discharged at 0.1 C to 3.0 V and left there for 5 min, followed by three times of discharges to 3.0 V at 0.1 C to obtain a fully discharged lithium-ion battery. After disassembly, the electrode plate was punched into a wafer with a diameter of 10 mm or 14 mm by using a fastening mold, and then thickness of the electrode plate was measured. Porosity of the electrode plate porosity was determined in accordance with GB/T24586.

XRD test: a sample of 1.0 g to 2.0 g was poured into a groove of a glass sample holder and compacted and smoothed by using a glass bottle, and then a test was performed by using an X-ray diffractometer according to JJSK 0131-1996 General Rule of X-Ray Diffractometer Analysis. The test was conducted with a voltage of 40 kV, a current of 30 mA, a scanning range of 10° to 85°, and a scanning step size of 0.0167° to obtain an X-ray diffraction pattern, where 0.24 s was set for each step. From the pattern, a largest peak intensity $I_2$ of 2θ at 28.4° and a largest peak intensity $I_1$ of 2θ at 21.0° were obtained, and the $I_2/I_1$ value was calculated.

Particle size distribution test: into a clean 50 ml beaker, 0.02 g of sample powder was added, about 20 ml of deionized water was added, and a few drops of surfactant (1%) were added dropwise to make the powder completely dispersed in the water. Then, the mixture was subjected to ultrasound for 5 min in a 120 W ultrasonic cleaning machine, and particle size distribution was tested with a MasterSizer 2000. A volume-based particle size distribution curve was obtained by using a laser nanometer size analyzer so as to calculate $D_v50$ of the sample.

Capacity retention rate test: the lithium-ion battery was charged and discharged under a constant temperature condition of 25° C. by using a Neware machine so as to test its cycling performance. In the process, the lithium-ion battery was charged at 1.0 C to an upper cut-off voltage and then discharged at 0.5 C to 3.0 V. The ratio of discharge capacity after 500 cycles to discharge capacity of the first cycle was used as the capacity retention rate.

Cycling swelling rate test: a flat panel thickness gauge (with a load capacity of 600 g) was used to measure the thickness of a fresh lithium-ion battery at half charge (50% SOC). At the 500th cycle, when the lithium-ion battery was at full charge (100% SOC), the flat panel thickness gauge (with a load capacity of 600 g) was used again to measure the thickness of the lithium-ion battery at that point. This thickness was compared with the thickness at the initial half-charged state to obtain the cycling swelling rate of the fully charged lithium-ion battery.

Test of lithium precipitation after cycling by disassembly: at a temperature of 25° C., the lithium-ion battery was charged with a constant current at 1 C to an upper cut-off voltage. Then, the lithium-ion battery was charged to a current of 0.05 C by using a constant voltage of the upper cut-off voltage, left at rest for 2 min, then discharged to 3.0 V at a constant current of 1.5 C, and left at rest for 2 min. This was set as one cycle. After 500 cycles, the lithium-ion battery was disassembled and an electrode assembly was obtained. The electrode assembly was spread flat and observed for any region with lithium precipitation of more than 2 mm$^2$ on the negative electrode plate, and the negative electrode plate was determined to have lithium precipitation if any such region was found.

Negative electrode active substance layer shedding/current collector creasing rate: at a temperature of 25° C., the lithium-ion battery was charged to an upper voltage at a constant current of 0.5 C, then charged to a current of 0.05 C at a constant voltage, left at rest for 2 min, then discharged to 3.0 V at a constant current of 0.5 C, and left at rest for 2 min. This was set as one cycle. After 100 cycles, the lithium-ion battery was disassembled and an electrode assembly was obtained. The electrode assembly was spread flat and observed for any shedding of active substance layer of more than 2 mm$^2$ on the negative electrode plate off the current collector, and if any was found, the negative electrode plate was determined to have active substance layer shedding. The negative electrode current collector was determined to have creasing if the crease region of more than 1 mm$^2$ was found on the current collector. If any shedding or tearing was determined, the negative electrode active substance layer shedding/current collector crease deformation was recorded.

Test Results of the Examples and Comparative Examples

Table 1 shows how the performance of lithium-ion batteries is influenced by the mass percentage of lithium in the first silicon-based material particles being A % and the mass percentage of lithium in the second silicon-based material particles being B %. In Examples 1 to 5 and Comparative Example 1, the median particle size $D_v50$ of the first silicon-based material particles in the first active substance layer is 15 μm, and the median particle size $D_v50$ of the second silicon-based material particles in the second active substance layer is 5 μm; the first active substance layer has an electrode plate porosity of 42.1%, and the second active substance layer has an electrode plate porosity of 38.1%; the mass percentage of silicon in the first active substance layer is 15%, and the mass percentage of silicon in the second active substance layer is 5%; and $I_2/I_1$ of the second silicon-based material particles is 0.2.

TABLE 1

| | A | B | A/B | Capacity rentention rate after 500 cycles (%) | Swelling rate after 500 cycles (%) | Active substance layer shedding/current collector creasing rate |
|---|---|---|---|---|---|---|
| Comparative Example 1 | 10 | 10 | 1 | 68.5 | 12.3 | 5/10 |
| Example 1 | 10 | 0.01 | 1000 | 87.2 | 10.2 | 0/10 |
| Example 2 | 10 | 0.5 | 20 | 86.5 | 10.5 | 0/10 |
| Example 3 | 10 | 1 | 10 | 86.2 | 11.2 | 1/10 |
| Example 4 | 10 | 1.5 | 6.7 | 84.3 | 11.5 | 1/10 |
| Example 5 | 10 | 3 | 3.3 | 82.3 | 11.6 | 2/10 |

It can be seen from the comparison of Examples 1 to 5 and Comparative Example 1 that, when the mass percentage of lithium in the first silicon-based material particles is greater than the mass percentage of lithium in the second silicon-based material particles, the capacity retention rate and swelling rate after cycling of the lithium-ion battery are significantly improved and the active substance layer shedding or current collector creasing rate after cycling was significantly decreased.

It can be seen from the comparison of Examples 1 to 5 that with the mass percentage of lithium in the second silicon-based material particles increasing, the capacity retention rate after cycling decreases, and the swelling rate of the lithium-ion battery and the rate of active substance layer shedding/current collector creasing tend to increase.

Table 2 shows how the percentage D1% of silicon in the first active substance layer, percentage D2% of silicon in the second active substance layer, and $I_2/I_1$ of the second silicon-based material particles influence the performance of the lithium-ion batteries. Preparation and other parameters of the lithium-ion batteries in Examples 6 to 10 are the same as those in Example 1.

TABLE 2

| | D1 | D2 | $I_2/I_1$ of second silicon-based material particles | Capacity retention rate after 500 cycles (%) | Swelling rate after 500 cycles (%) | Active substance layer shedding/current collector creasing rate |
|---|---|---|---|---|---|---|
| Example 1 | 15 | 5 | 0.2 | 87.2 | 10.2 | 0/10 |
| Example 6 | 15 | 5 | 0.32 | 81.50 | 12.00 | 0/10 |
| Example 7 | 18 | 10 | 0.45 | 79.20 | 12.20 | 0/10 |
| Example 8 | 20 | 10 | 0.64 | 76.30 | 12.40 | 0/10 |
| Example 9 | 25 | 10 | 0.72 | 74.20 | 13.30 | 0/10 |
| Example 10 | 30 | 10 | 0.9 | 72.50 | 13.40 | 1/10 |

It can be learned from comparison of Example 1 and Examples 6 to 10 that as $I_2/I_1$ increases, the cycling retention rate decreases. Therefore, a silicon oxide satisfying $0<I_2/I_1\leq 1$ needs to be selected.

It can be learned from comparison of Examples 6 to 10 that with the technical solution of this application used, active substance layer shedding/current collector creasing does not occur even though the amount of upper silicon has increased, which means the problem is effectively relieved.

Table 3 shows how the performance of lithium-ion batteries is influenced by the electrode plate porosity $K_1$% of the first active substance layer and the electrode plate porosity $K_2$% of the second active substance layer. Preparation and other parameters of the lithium-ion batteries in Examples 11 to 15 are the same as those in Example 1, where different electrode plate porosities are obtained by adjusting the processing technology.

TABLE 3

| | $K_1$ | $K_2$ | Capacity retention rate after 500 cycles (%) | Lithium precipitation rate after cycling |
|---|---|---|---|---|
| Example 11 | 32.50 | 27.50 | 81.50 | 2/10 |
| Example 12 | 36.20 | 29.20 | 79.20 | 1/10 |
| Example 13 | 37.80 | 26.30 | 78.30 | 0/10 |
| Example 14 | 40.2 | 25.40 | 77.20 | 0/10 |
| Example 15 | 45.2 | 28.20 | 76.50 | 0/10 |

It can be learned from comparison of Examples 11 to 15 that, when the electrode plate porosity of the first active substance layer is greater than the electrode plate porosity of the second active substance layer, the cycling performance and kinetic performance of the lithium-ion battery can be improved. The large porosity is favorable for the infiltration of electrolyte and diffusion of lithium ions, reducing the risk of lithium precipitation on the negative electrode after cycling, thereby avoiding cycling degradation caused by the precipitation of lithium.

Table 4 shows how the performance of lithium-ion batteries is influenced by the median particle size $D_v50$ of the first silicon-based material particles and the median particle size $D_v50$ of the second silicon-based material particles. Preparation and other parameters of the lithium-ion batteries in Examples 16 to 20 are the same as those in Example 1, and Examples 16 to 20 are obtained by adjusting $D_v50$ of different materials.

TABLE 4

| | $D_v50$ of first silicon-based material particles (μm) | $D_v50$ of second silicon-based material particles (μm) | Active substance layer shedding/current collector creasing rate |
|---|---|---|---|
| Example 16 | 8 | 4 | 0/10 |
| Example 17 | 8 | 5 | 0/10 |
| Example 18 | 8 | 6 | 1/10 |
| Example 19 | 10 | 4 | 0/10 |
| Example 20 | 10 | 4 | 0/10 |

It can be learned from comparison of Examples 16 to 20 that, when $D_v50$ of the first silicon-based material particles is greater than $D_v50$ of the second silicon-based material particles, the underlayer silicon has a small size and low cycling swelling and causes a small swelling force to the current collector, and therefore tearing rate of the electrode plate after cycling obviously decreases.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

What is claimed is:

1. A negative electrode plate comprising:

a current collector;

a first active substance layer comprising first silicon-based material particles, wherein a mass percentage of lithium in the first silicon-based material particles is A %, $8\leq A\leq 15$, porosity of the first active substance layer is $K_1$%, and $25<K_1<60$; and a second active substance layer comprising second silicon-based material particles is located between the current collector and the first active substance layer, wherein a mass percentage of lithium in the second silicon-based material particles is B %, A>B, porosity of the second active substance layer is $K_2$%, $23<K_2<55$, and $K_1>K_2$.

2. The negative electrode plate according to claim 1, wherein A/B is between 5 and 30.

3. The negative electrode plate according to claim 1, wherein a surface of the first silicon-based material particles has one or more of $M_xSiO_y$, M comprises at least one of Mg, Al, Zn, Ca, Ba, or B, $0<x<3$, and $0.5<y<6$.

4. The negative electrode plate according to claim 1, wherein the second silicon-based material particles comprise nano-silicon crystallites.

5. The negative electrode plate according to claim 4, wherein:

the nano-silicon crystallites satisfy $0<I_2/I_1\leq 1$, wherein $I_1$ indicates a largest intensity of peaks at 2θ of 28.0° to 29.5° as in an X-ray diffraction pattern of the nano-silicon crystallites, and $I_2$ indicates a largest intensity of peaks at 2θ of 20.0° to 21.5° as in an X-ray diffraction pattern of the nano-silicon crystallites.

6. The negative electrode plate according to claim 1, wherein:

a median particle size $D_v50$ of the first silicon-based material particles is greater than a median particle size $D_v50$ of the second silicon-based material particles, the median particle size $D_v50$ of the first silicon-based material particles satisfies 5 μm≤$D_v50$ of the first silicon-based material particles≤25 μm, and the median particle size $D_v50$ of the second silicon-based material particles satisfies 1 μm≤$D_v50$ of the second silicon-based material particles≤8 μm.

7. The negative electrode plate according to claim 1, wherein the first active substance layer and the second active substance layer each independently comprise at least one of natural graphite, mesocarbon microbeads, lithium titanate, soft carbon, or hard carbon.

8. An electrochemical apparatus comprising a negative electrode plate that comprises:

a current collector;

a first active substance layer comprising first silicon-based material particles, wherein a mass percentage of lithium in the first silicon-based material particles is A %, 8≤A≤15, porosity of the first active substance layer is $K_1$%, and 25<$K_1$<60; and a second active substance layer comprising second silicon-based material particles is located between the current collector and the first active substance layer, wherein a mass percentage of lithium in the second silicon-based material particles is B %, A>B, porosity of the second active substance layer is $K_2$%, 23<$K_2$<55, and $K_1$>$K_2$.

9. The electrochemical apparatus according to claim 8, wherein A/B is between 5 and 30.

10. The electrochemical apparatus according to claim 8, wherein:

the negative electrode plate satisfies a median particle size $D_v50$ of the first silicon-based material particles is greater than a median particle size $D_v50$ of the second silicon-based material particles, the median particle size $D_v50$ of the first silicon-based material particles satisfies 5 μm≤$D_v50$ of the first silicon-based material particles≤25 μm, and the median particle size $D_v50$ of the second silicon-based material particles satisfies 1 μm≤$D_v50$ of the second silicon-based material particles≤8 μm.

11. An electronic apparatus comprising an electrochemical apparatus that comprises a negative electrode plate comprising:

a current collector;

a first active substance layer comprising first silicon-based material particles, wherein a mass percentage of lithium in the first silicon-based material particles is A %, 8≤A≤15, porosity of the first active substance layer is $K_1$%, and 25<$K_1$<60; and a second active substance layer comprising second silicon-based material particles is located between the current collector and the first active substance layer, wherein a mass percentage of lithium in the second silicon-based material particles is B %, A>B, porosity of the second active substance layer is $K_2$%, 23<$K_2$<55, and $K_1$>$K_2$.

12. The electronic apparatus according to claim 11, wherein A/B is between 5 and 30.

13. The electronic apparatus according to claim 11, wherein 32<K1<46.

14. The electronic apparatus according to claim 11, wherein 25<K2<30.

15. The electronic apparatus according to claim 11, wherein a capacity retention rate after 500 cycles is between 76% and 82%.

16. The electronic apparatus according to claim 11, wherein a capacity retention rate after 500 cycles is between 82% and 88%.

17. The electronic apparatus according to claim 11, wherein a capacity retention rate after 500 cycles is between 72% and 88%.

* * * * *